US011342950B2

(12) United States Patent
Khawand

(10) Patent No.: US 11,342,950 B2
(45) Date of Patent: May 24, 2022

(54) OUT-OF-BAND RADIO FREQUENCY EMISSION FILTERING

(71) Applicant: Microsoft Technology Licensing, LLC, Redmond, WA (US)

(72) Inventor: Charbel Khawand, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 4 days.

(21) Appl. No.: 17/000,986

(22) Filed: Aug. 24, 2020

(65) Prior Publication Data

US 2021/0376870 A1    Dec. 2, 2021

Related U.S. Application Data

(60) Provisional application No. 63/030,631, filed on May 27, 2020.

(51) Int. Cl.
 *H04L 7/00* (2006.01)
 *H04B 1/04* (2006.01)
 *H04L 27/04* (2006.01)

(52) U.S. Cl.
 CPC ......... *H04B 1/0475* (2013.01); *H04L 7/0008* (2013.01); *H04L 27/04* (2013.01); *H04B 2001/0408* (2013.01)

(58) Field of Classification Search
 CPC ......... H04L 7/0008; H04L 27/04; H04B 1/04; H04B 1/0475; H04B 1/7073

(Continued)

(56) References Cited

U.S. PATENT DOCUMENTS 8,620,254 B2   12/2013   Molnar et al.
8,634,494 B2   1/2014   Bai
(Continued)

FOREIGN PATENT DOCUMENTS

EP   1706975 B1   1/2008
EP   2421171 A2   2/2012

OTHER PUBLICATIONS

Chung, et al., "Inter-Band Carrier Aggregation Digital Transmitter Architecture with Concurrent Multi-Band Delta-Sigma Modulation Using Out-of-Band Noise Cancellation", In Proceedings of the IEEE MTT-S International Microwave Symposium, May 17, 2015, 4 Pages.

(Continued)

*Primary Examiner* — Emmanuel Bayard
(74) *Attorney, Agent, or Firm* — Holzer Patel Drennan

(57) ABSTRACT

A system filters out-of-band radio frequency emissions generated by wireless transmission of a first signal by a first transmitter from a wireless transmission of a second transmitter. The first signal is communicated from the first transmitter to the second transmitter via one or more wired connections. An out-of-band portion of a modulated format of the first signal is inverted to generate an inverted out-of-band component signal. The inverted out-of-band component signal is combined with a second signal of the second transmitter to create a filtering second signal. The filtering second signal is wirelessly transmitted from the second transmitter concurrently with wireless transmission of the first signal by the first transmitter, wherein the wireless transmission of the inverted out-of-band component signal in the filtering second signal by the second transmitter is synchronized with the wireless transmission of the first signal by the first transmitter.

20 Claims, 5 Drawing Sheets

(58) Field of Classification Search
USPC .......................... 375/219–220, 298, 354, 356
See application file for complete search history.

(56) References Cited

U.S. PATENT DOCUMENTS

| | | | |
|---|---|---|---|
| 8,804,871 | B2 | 8/2014 | Rimini et al. |
| 9,077,409 | B2 | 7/2015 | Lozhkin |
| 9,130,747 | B2 | 9/2015 | Zinser et al. |
| 2014/0080427 | A1 | 3/2014 | Babitch |
| 2015/0022015 | A1* | 1/2015 | Kim .................. H02J 50/80 |
| | | | 307/104 |
| 2015/0214996 | A1 | 7/2015 | Cohen |
| 2018/0176668 | A1* | 6/2018 | Froc .................. H04Q 11/0067 |
| 2018/0294913 | A1* | 10/2018 | Chen .................. H04J 14/0227 |
| 2020/0065277 | A1* | 2/2020 | Poulsen .................. G06F 13/36 |

OTHER PUBLICATIONS

Martin, Ken, "Complex Signal Processing is Not—Complex", In Journal of the IEEE Transactions on Circuits and Systems I: Regular Papers, vol. 51, Issue 9, Sep. 13, 2004, pp. 1823-1836.

"International Search Report and Written Opinion Issued in PCT Application No. PCT/US2021/026744", dated Jul. 8, 2021, 11 Pages.

\* cited by examiner

OUT-OF-BAND RADIO FREQUENCY EMISSION FILTERING

CROSS-REFERENCE TO RELATED APPLICATIONS

This application claims benefit of priority to U.S. Provisional Patent Application No. 63/030,631, entitled "Out-of-band Radio Frequency Emission Filtering" and filed on May 27, 2020, which is specifically incorporated by reference for all that it discloses and teaches.

BACKGROUND

Modern electronic communication devices often provide component circuitry for multiple wireless communication modes (e.g., Bluetooth, Wi-Fi, LTE, 5G). In some implementations, one wireless transmitter (e.g., Bluetooth), labeled an "aggressor" transmitter, can emit spurious out-of-band radio frequency emissions (e.g., resulting from the modulation process and non-linearities in the transmitter) that reside outside the channel bandwidth. For example, out-of-band radio frequency emissions emitted by one radiofrequency (RF) source (e.g., a Bluetooth transmitter) may include $2^{nd}$ and $3^{rd}$ harmonics of the carrier signal that lie outside the channel bandwidth (e.g., outside of the 2.402 GHz to 2.480 GHz range).

SUMMARY

The described technology filters out-of-band radio frequency emissions generated by wireless transmission of a first signal by a first transmitter from a wireless transmission of a second transmitter. The first signal is communicated from the first transmitter to the second transmitter via one or more wired connections. An out-of-band portion of a modulated format of the first signal is inverted to generate an inverted out-of-band component signal. The inverted out-of-band component signal is combined with a second signal of the second transmitter to create a filtering second signal. The filtering second signal is wirelessly transmitted from the second transmitter concurrently with wireless transmission of the first signal by the first transmitter, wherein the wireless transmission of the inverted out-of-band component signal in the filtering second signal by the second transmitter is synchronized with the wireless transmission of the first signal by the first transmitter.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Out-of-band radio frequency emissions can then couple with signals in a nearby Wi-Fi transmitter (a "victim" transmitter), for example, as noise. Unintentionally, the power amplifier of the Wi-Fi transmitter can then amplify the noise as it transmits its own Wi-Fi signals, which may be centered at 2.4 GHz or 5 GHz, for example. This combination results in amplified out-of-band RF emissions from the victim transmitter. As such, out-of-band radio frequency emissions can degrade the performance of the Wi-Fi transmitter by introducing and amplifying noise to the Wi-Fi transmission. Hardware bandpass filters may be used in attempts to mitigate the negative effects of such out-of-band radio frequency emissions, but such hardware filters are costly, less effective if the antennas are using close frequencies, and ineffective at filtering out-of-band radio frequency emission noise coupling within an RF power amplifier (power amp) of a victim transmitter. An RF power amplifier is a type of electronic amplifier that converts a low-power radio-frequency signal into a higher power signal to drive the antenna of a transmitter. The described technology can be implemented in hardware, software, or a combination of hardware and software to filter out-of-band radio frequency emissions without reliance on such hardware bandpass filters.

Example Bluetooth and Wi-Fi wireless technologies are used as example wireless communications technologies herein, but it should be understood that the described technology may be employed for other wireless communication technologies, including without limitation varieties of mobile telephone standards (e.g., LTE, 5G). In one implementation, Bluetooth wireless technology exchanges data over short distances using short-wave UHF RF waves from 2.402 GHz to 2.480 GHz, and Wi-Fi wireless technology exchanges data using radio frequency ranges including the 900 MHz, 2.4 GHz, 3.6 GHz, 4.9 GHz, 5 GHz, 5.9 GHz, and 60 GHz bands. When the channel bandwidths used by proximate wireless transmitters are close, out-of-band radio frequency emissions from an "aggressor" wireless transmitter can "leak out" of the aggressor wireless transmitter and couple with a transmission signal of a "victim" wireless transmitter, resulting in out-of-band radio frequency emissions from the victim wireless transmitter. In some circumstances, such coupling may occur within the power amplifier of the victim wireless transmitter, causing the out-of-band radio frequency emissions to be amplified in the wireless transmissions of the victim wireless transmitter.

Figure 1:
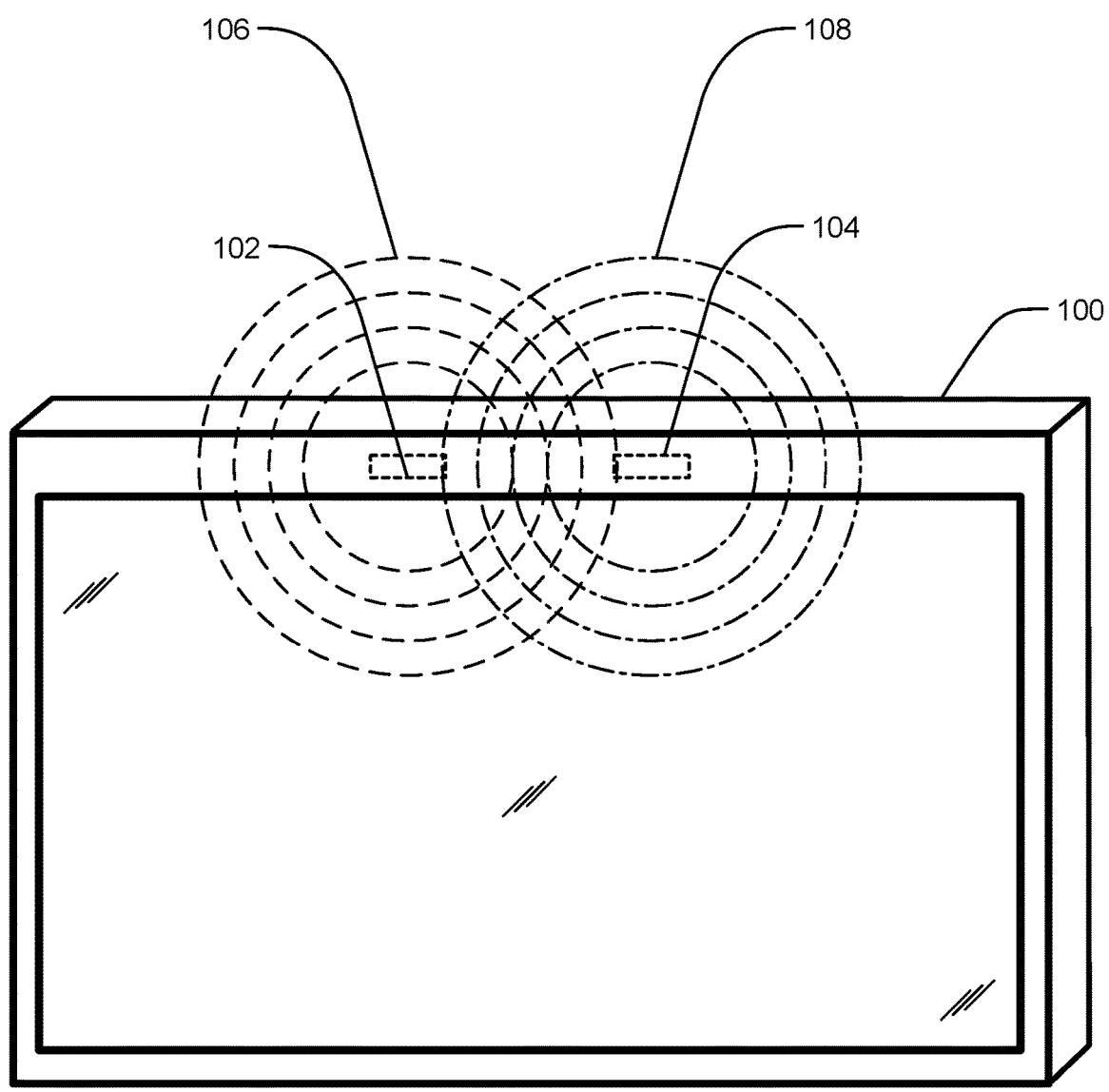
FIG. 1 illustrates an example communication device including a first transmitter and a second transmitter.

FIG. 1 illustrates an example communication device 100 including a first transmitter 102 and a second transmitter 104. The transmitters are positioned in proximity to one another in the bezel of the communication device 100. The two transmitters have different channel bandwidths. In one example, the first transmitter 102 is a Bluetooth transmitter with a channel bandwidth in the 2.402 GHz to 2.480 GHz range, and the second transmitter 104 is a Wi-Fi transmitter with a channel bandwidth centered at 2.4 GHz or 5 GHz.

As shown by the radiating dashed-line circles emanating from the first transmitter 102, a first radio frequency (RF) signal 106 can radiate from the first transmitter 102, reaching the second transmitter 104. Generally, the channel bandwidths of the first transmitter 102 and the second transmitter 104 do not overlap or are otherwise protected from in-band noise emanating from other transmitters. However, some transmitters leak out-of-band radio frequency emissions (e.g., $2^{nd}$ and/or $3^{rd}$ harmonics) that can reach another nearby transmitter. In this sense, "out-of-band" refers to emitted RF energy that is outside the channel bandwidth of the transmitter (e.g., energy emitted by a Bluetooth transmitter outside of the 2.402 GHz to 2.480 GHz range, energy emitted by a Wi-Fi transmitter outside of the 2.4 GHz or 5 GHz channels).

A transmitter that leaks out-of-band radio frequency emissions that couple into another transmitter is referred to herein as an "aggressor" transmitter. A transmitter that experiences such coupling of the out-of-band radio frequency emissions of an aggressor transmitter is referred to herein as a "victim" transmitter. The out-of-band radio frequency emissions of the aggressor transmitter can electromagnetically couple to components (e.g., a power amplifier) of the transmitter to introduce noise into transmissions of the victim transmitter. In the case where the component is a power amplifier, for example, the out-of-band noise can actually be amplified in the wireless transmission of the victim transmitter.

It should be understood that a victim transmitter can also leak out-of-band radio frequency emissions and inject out-of-band noise into the transmission of another victim transmitter in the communication device 100. RF transmission energy 108 of the second transmitter 104 is shown in FIG. 1.

Figure 2:
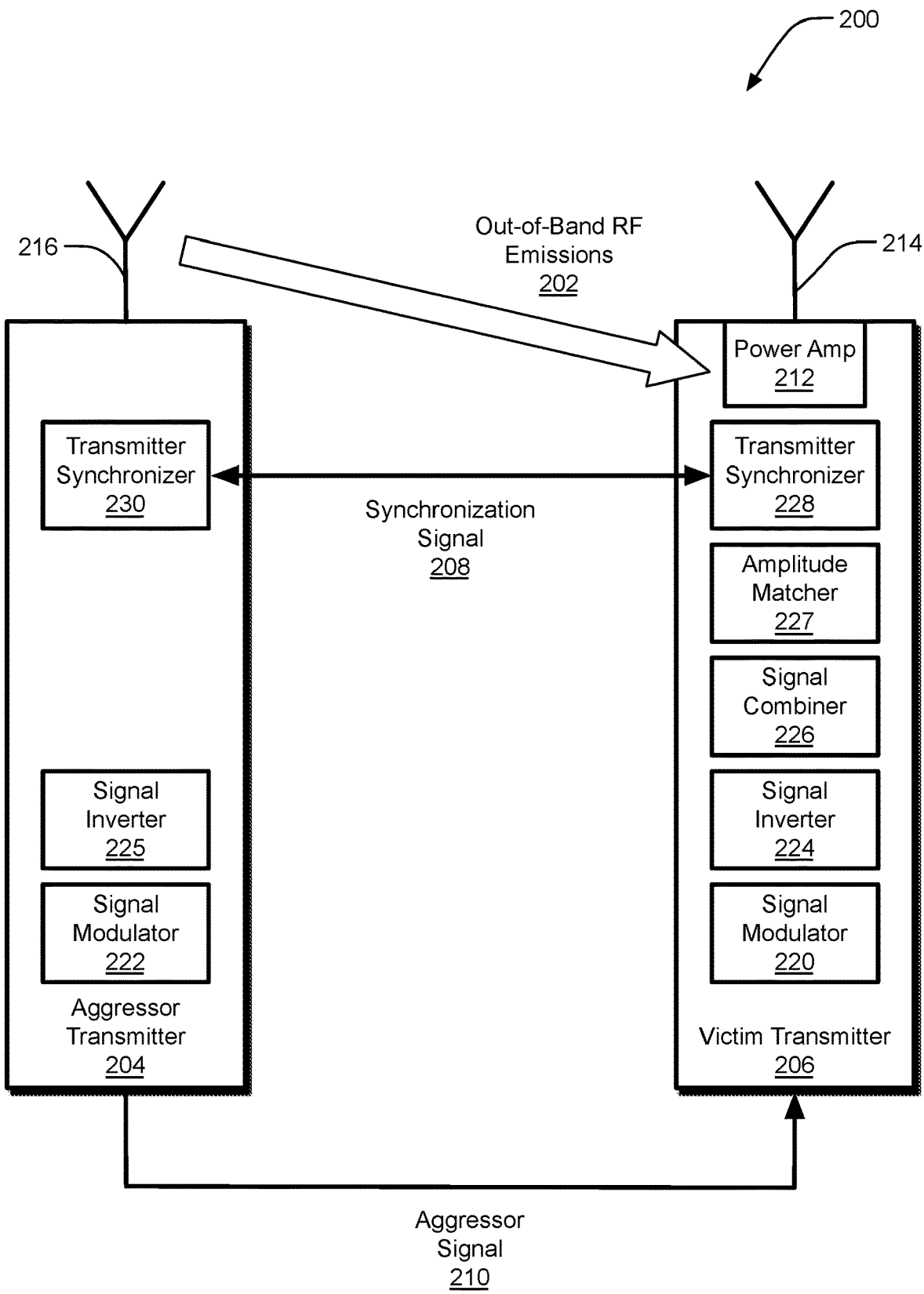
FIG. 2 illustrates an example system for filtering out-of-band radio frequency emissions generated by wireless transmission of an RF signal by an aggressor transmitter from a wireless transmission of a victim transmitter.

FIG. 2 illustrates an example system 200 for filtering out-of-band radio frequency emissions 202 generated by wireless transmission of an RF signal by an aggressor transmitter 204 from a wireless transmission of a victim transmitter 206. Generally, the channel bandwidths of the aggressor transmitter 204 and the victim transmitter 206 do not overlap or are otherwise protected from in-band noise emanating from other transmitters (e.g., hardware filters). However, some transmitters leak out-of-band radio frequency emissions (e.g., $2^{nd}$ and/or $3^{rd}$ harmonics) that can reach another nearby transmitter. In this sense, "out-of-band" refers to emitted RF energy that is outside the channel bandwidth of the transmitter (e.g., energy emitted by a Bluetooth transmitter outside of the 2.402 GHz to 2.480 GHz range, energy emitted by a Wi-Fi transmitter outside of the 2.4 GHz or 5 GHz channels).

The example scenario presented in FIG. 2 depicts an aggressor transmitter 204 (e.g., a Bluetooth transmitter) that is leaking out-of-band radio frequency emissions 202 (i.e., RF energy) that are coupling with components of the victim transmitter 206. The aggressor transmitter 204 and the victim transmitter 206 are connected by one or more wired connections within a communication device. For example, the synchronization signal 208 and the aggressor signal 210 are communicated between the aggressor transmitter 204 and the victim transmitter 206 via one or more wired connections.

The victim transmitter 206 includes a power amp 212 (power amplifier) that amplifies a low-power RF signal for transmission via an antenna 214. When transmitting, the victim transmitter 206 and antenna 214 generally emit in-band RF energy within a channel bandwidth of the victim transmitter 206 (e.g., within a Wi-Fi frequency range). When transmitting, the aggressor transmitter 204 and its corresponding antenna 216 generally emit in-band RF energy within a channel bandwidth of the aggressor transmitter 204 (e.g., within a Bluetooth frequency range). However, in some scenarios, the aggressor transmitter 204 can also emit out-of-band RF energy (referred to as out-of-band radio frequency emissions 202 or out-of-band RF emissions) while transmitting. Such out-of-band radio frequency emissions 202 can couple to the circuitry in the victim transmitter 206 and be introduced as noise in the wireless transmissions of the victim transmitter 206.

In various implementations, the system 200 can cancel out or decrease such noise in the wireless transmissions of the victim transmitter 206. Before wirelessly transmitting a signal (e.g., the aggressor signal 210), the aggressor transmitter 204 first sends the aggressor signal 210 to the victim transmitter 206 via one or more wired connections. The victim transmitter 206 combines aspects of the aggressor signal 210 with its own transmission signal to filter or cancel out the out-of-band RF emissions from its wireless transmission.

There are various implementations for allocating signal processing operations between the aggressor transmitter 204 and the victim transmitter 206. In one implementation, the aggressor signal 210 receives (e.g., via a wired connection) a sequence of symbols in an unmodulated format. The victim transmitter 206 receives the aggressor signal 210 in the unmodulated format. A signal modulator 220, which can include hardware and software, modulates an out-of-band portion of the aggressor signal 210 into a modulated format of the victim transmitter (e.g., Wi-Fi format) signal. A signal inverter 224, which can include hardware and software, inverts the modulated out-of-band portion of the aggressor signal 210. A signal combiner 226, which can include hardware and/or software, combines the modulated, inverted out-of-band portion of the aggressor signal 210 to the victim transmitter's own transmission signal to create a filtering second signal, which cancels out the effects of the out-of-band RF emissions 202 from its own transmission. In other implementations, the victim transmitter 206 modulates its own signal and the inverted symbols from the aggressor transmitter 204 together, without the need for a separate hardware signal combiner 226. Instead, the signal combiner 226 may be part of a modulator in the victim transmitter 206. Other implementations are also contemplated.

As discussed below, the transmission timing of the modulated, inverted out-of-band portion of the aggressor signal 210 is synchronized with the wireless transmission of the aggressor signal by the aggressor transmitter 204 to satisfy a synchronization timing condition. In one example, if the transmission timings are synchronized enough to match or be highly-correlated, they satisfy a synchronization timing condition, although other synchronization timing conditions may be defined. Such conditions may be determined based on their effectiveness in canceling or reducing aggressor-transmitter-induced out-of-band noise in the victim transmitter's wireless transmission (e.g., an out-of-band noise condition).

In addition, the modulated, inverted out-of-band portion of the aggressor signal 210 combined into the victim transmitter's wireless transmission signal is amplitude-matched (or highly correlated) with the out-of-band RF emissions 202 received by the victim transmitter 206 to satisfy an amplitude-match condition. In one example, if the amplitudes are sufficiently matched or highly-correlated, they satisfy an amplitude-match condition, although other amplitude-match conditions may be defined. Such conditions may be determined based on their effectiveness in canceling or reducing aggressor-transmitter-induced out-of-band noise in the victim transmitter's wireless transmission (e.g., an out-of-band noise condition).

In combination, satisfaction of the synchronization timing condition and/or the amplitude-matched condition results in a level of out-of-band noise in the victim transmitter's wireless transmission signal that satisfies an overall out-of-band noise condition (e.g., the level of out-of-band noise is below a designated threshold). In this manner, noise resulting from the coupling of an aggressor transmitter's out-of-band RF emissions into a victim transmitter's transmission signal can be cancelled out or diminished without the need for additional hardware bandpass filters.

In another implementation, much of the signal processing of the aggressor signal 210 can be performed by the aggressor transmitter 204. In this implementation, the aggressor signal 210 is modulated by a signal modulator 222, which can include hardware and software, in the aggressor transmitter 204. The signal modulator 222 modulates an out-of-band portion of the aggressor signal 210 in the modulation format of the victim transmitter 206. In addition, a signal inverter 225 in the aggressor transmitter 204 inverts the modulated out-of-band portion of the aggressor signal 210 before the aggressor transmitter 204 sends the aggressor signal 210 to the victim transmitter 206 in a modulated format of the victim transmitter 206. This implementation can also cancel out or diminish noise resulting from the coupling of an aggressor transmitter's out-of-band RF emissions from a victim transmitter's transmission signal without the need for additional hardware bandpass filters.

In other implementations, the modulation and inverting operations may be allocated in various combinations between the aggressor transmitter 204 and the victim transmitter 206. These implementations can also cancel out or diminish noise resulting from the coupling of an aggressor transmitter's out-of-band RF emissions from a victim transmitter's transmission signal without the need for additional hardware bandpass filters.

As previously discussed, the magnitude of the inverted out-of-band component signal in the filtering second signal is adapted to match or highly correlate the amplitude of the out-of-band RF emissions actually coupling into the victim transmitter 206. In one implementation, an amplitude matcher 227 can monitor the received out-of-band RF emissions 202 actually received by the victim transmitter 206 from the aggressor transmitter 204, estimate the power density of the received out-of-band RF emissions 202, and adjust the amplitude of the modulated, inverted out-of-band portion of the aggressor signal 210 that is combined with the victim transmitter's own transmission signal to match or highly correlate the amplitude of the received out-of-band RF emissions 202.

As previously discussed, the timing of the wireless transmission by the aggressor transmitter 204 and the victim transmitter 206 are synchronized so that the aggressor signal is transmitted by the aggressor transmitter 204 at the same time as the inverted out-of-band portion of the aggressor signal 210 by the victim transmitter 206. Accordingly, a transmitter synchronizer 228, which can include hardware and software, generates the synchronization signal 208 to synchronize the wireless transmission of the inverted out-of-band component signal in the filtering second signal by the victim transmitter with the wireless transmission of the aggressor signal by the aggressor transmitter. The transmitter synchronizer 228 communicates the synchronization signal 208 to the transmitter synchronizer 230 of the aggressor transmitter 204 to match or highly correlate the timing of the respective wireless transmissions.

The timing error between the aggressor signal and the filtering second signal can be reduced or eliminated in one implementation by shifting the modulated signal timing of the victim transmitter 206 until the out-of-band power density satisfies a power density condition (e.g., is below a programmable threshold). Once the proper timing is determined, the victim transmitter 206 can, if needed, ask the aggressor transmitter 204 to send its symbols in the proper timing. The better matched the synchronization is between the aggressor signal and the inverted out-of-band portion of the aggressor signal, the better the noise is cancelled or diminished from the victim transmitter 204.

In another implementation, the victim transmitter 206 can receive time synchronization information corresponding to out-of-band symbol timing and sent by the aggressor transmitter 204. The victim transmitter 206 can then use the time synchronization information for clock-based synchronization between the two transmitters to synchronize the transmission of the filtering second signal by the victim transmitter 206 with the transmission of the corresponding symbols by the aggressor transmitter 204.

In one implementation, the synchronization signal 208 may include a shift delay indicating a time period or number of clock cycles that the aggressor transmitter 204 is to delay wireless transmission of the aggressor signal so that the out-of-band radio frequency emissions 202 synchronize with the wireless transmission of the inverted out-of-band component signal in the filtering victim signal. In one implementation, the synchronization may be implemented using an adaptive filter to adjust the synchronization signal 208 based on a power density measurement or estimation of the out-of-band energy in the wireless transmission by the victim transmitter 206, although other synchronization methods may also be employed. These varying implementations allow for variations in transmitter design, such that either or both transmitters can be responsible for the synchronization of the filtering victim signal with the aggressor signal's out-of-band RF emissions 202.

Figure 3:
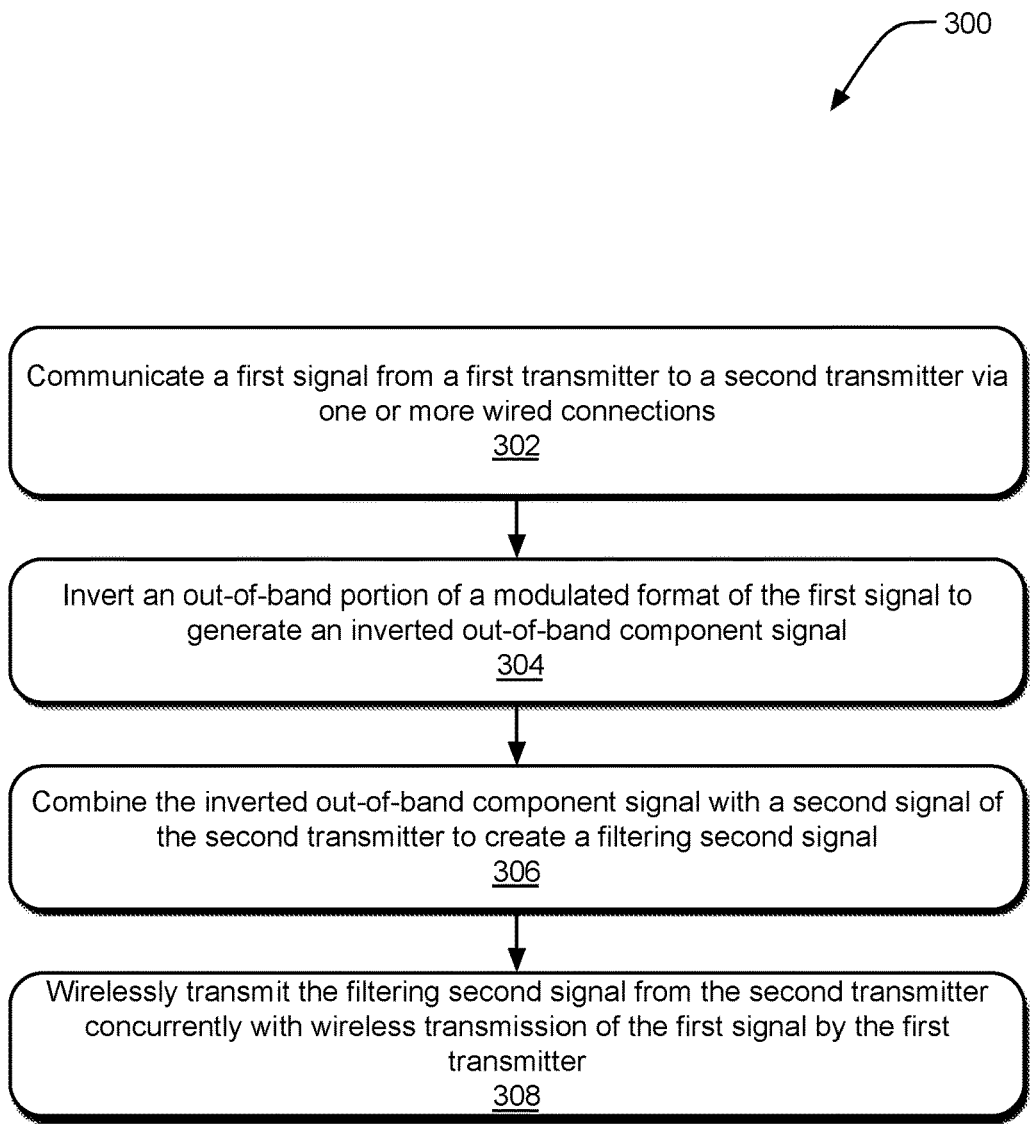
FIG. 3 illustrates example operations for filtering out-of-band radio frequency emissions.

FIG. 3 illustrates example operations 300 for filtering out-of-band radio frequency emissions. A communicating operation 302 communicates a first signal (e.g., the aggressor signal) from the first transmitter to the second transmitter via one or more wired connections. The communicated aggressor signal may be a sequence of symbols to be transmitted by the first transmitter or some signal processed version of those symbols (e.g., inverted and/or modulated in the modulation format of the second transmitter). If the first signal is not modulated into the modulation format of the second transmitter by a signal modulator of the first transmitter, then a signal modulator of the second transmitter will perform the modulation on an out-of-band portion of the aggressor signal.

An inversion operation 304 inverts an out-of-band portion of the first signal to generate an inverted out-of-band component signal. Generally, inversion may be performed by either transmitter. Examples include using a 180-degree phase-shifted version of the signal and applying an inverter to the modulated signal without a phase change. In one implementation, the inversion operation 304 may be performed by a signal inverter in the first transmitter. If the out-of-band portion of the first signal is not inverted (e.g., by a signal inverter) of the first transmitter, then a signal inverter of the second transmitter will perform the inversion. In another implementation, inversion, e.g., in the form of a 180-degree phase change applied to each symbol, may be performed prior to the modulation by either transmitter.

A combining operation 306 combines the inverted out-of-band component signal with a second signal of the second transmitter to create a filtering signal. A synchronized transmission operation 308 wirelessly transmits the filtering second signal from the second transmitter concurrently with wireless transmission of the first signal by the first transmitter. The concurrent wireless transmissions are performed such that the wireless transmission of the inverted out-of-band component signal in the filtering second signal by the second transmitter is synchronized with the wireless transmission of the first signal by the first transmitter.

In another implementation, the aggressor transmitter sends information about the frequency profile of its signal, such as frequency band or a sub-carrier frequency at which the out-of-band emissions are to be found. In one implementation, the aggressor transmitter sends information about the frequency of the second harmonic of its signal to the victim transmitter, which uses this information to place the inverted symbols at the proper sub-carrier frequencies.

In one implementation, an adjusting operation (not shown) adjusts the amplitude of the inverted out-of-band component signal to satisfy an amplitude condition. In one implementation, the amplitude condition is satisfied if the amplitude of the inverted out-of-band component signal matches or highly correlates the amplitude of out-of-band radio frequency emissions received from the wireless transmission of the first signal by the first transmitter. In another implementation, the amplitude condition is satisfied if the amplitude of the out-of-band energy in the RF signal transmitted by the second transmitter is below an acceptable threshold. Other variations of the amplitude condition may also be employed. The better the amplitudes are matched, the better the noise is cancelled or diminished from the victim transmitter.

Figure 4:
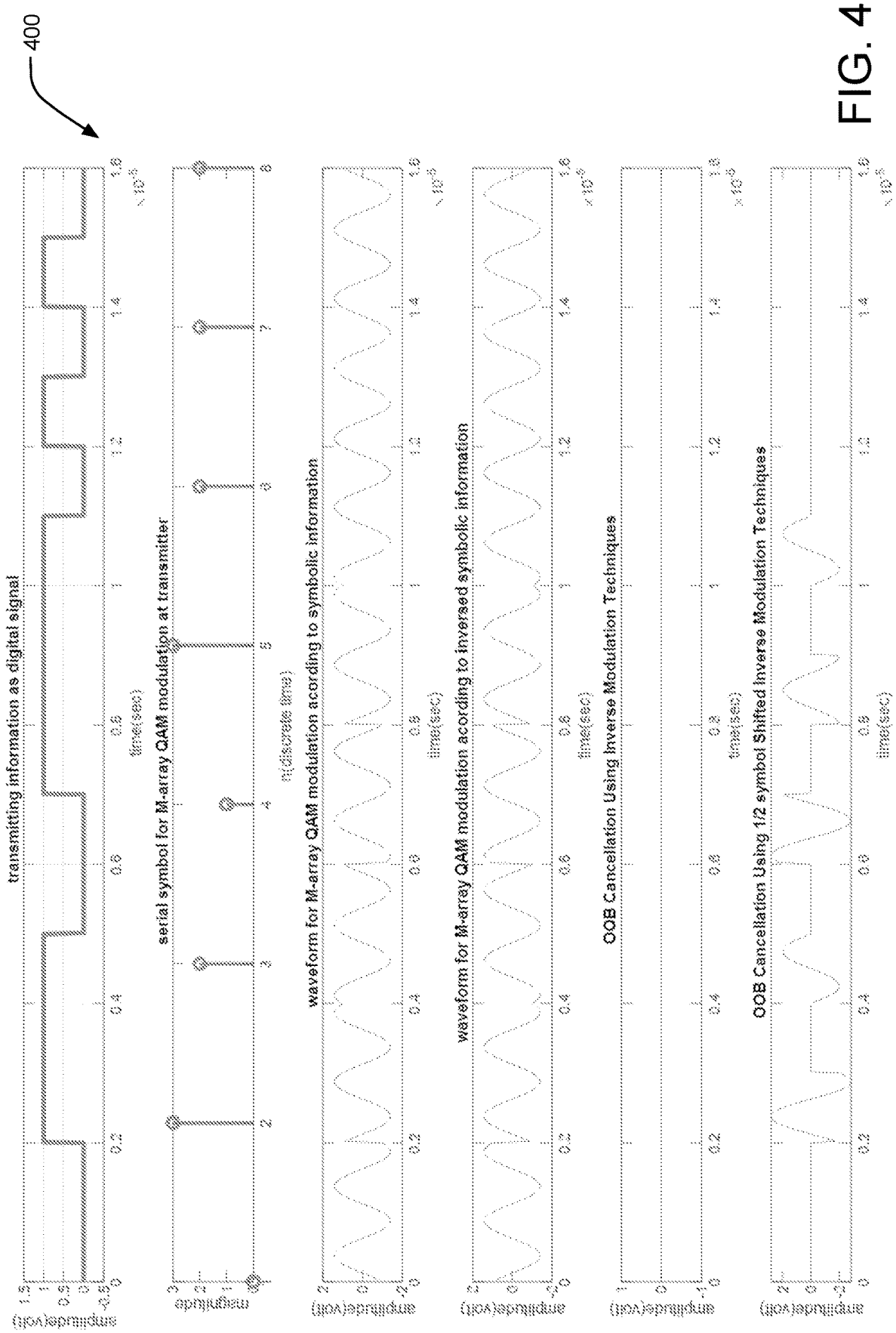
FIG. 4 illustrates various signal components relating to filtering out-of-band radio frequency emissions.

FIG. 4 illustrates various signal components 400 relating to filtering out-of-band radio frequency emissions. A first graph, entitled "transmitting information as digital signal," depicts a digital signal (the aggressor signal) represented as a sequence of symbols. A second graph, entitled "serial symbol for M-array QAM modulation at transmitter," depicts the sequence of symbols corresponding to the digital signal in the first figure.

A third graph, entitled "waveform for M-array QAM modulation according to symbolic information," depicts an out-of-band portion of the aggressor signal in the modulated format of a victim transmitter. A fourth graph, entitled "waveform for M-array QAM modulation according to inverted symbolic information," depicts an inverted version of the out-of-band portion of the aggressor signal in the modulated format of a victim transmitter. A fifth graph, entitled "OOB Cancellation Using Inverse Modulation Techniques," depicts a result of the transmission of the aggressor signal by the aggressor transmitter synchronized with transmission of the inverted version of the out-of-band portion of the aggressor signal in the modulated format of a victim transmitter. As shown in the fifth graph, the out-of-band (OOB) energy is canceled out. A sixth graph, entitled "OOB Cancellation Using ½ symbol shifted Inverse Modulate Techniques," depicts non-zero OOB energy resulting from a lack of synchronization between transmission of the aggressor signal by the aggressor transmitter and transmission of the inverted version of the out-of-band portion of the aggressor signal in the modulated format of a victim transmitter.

Figure 5:
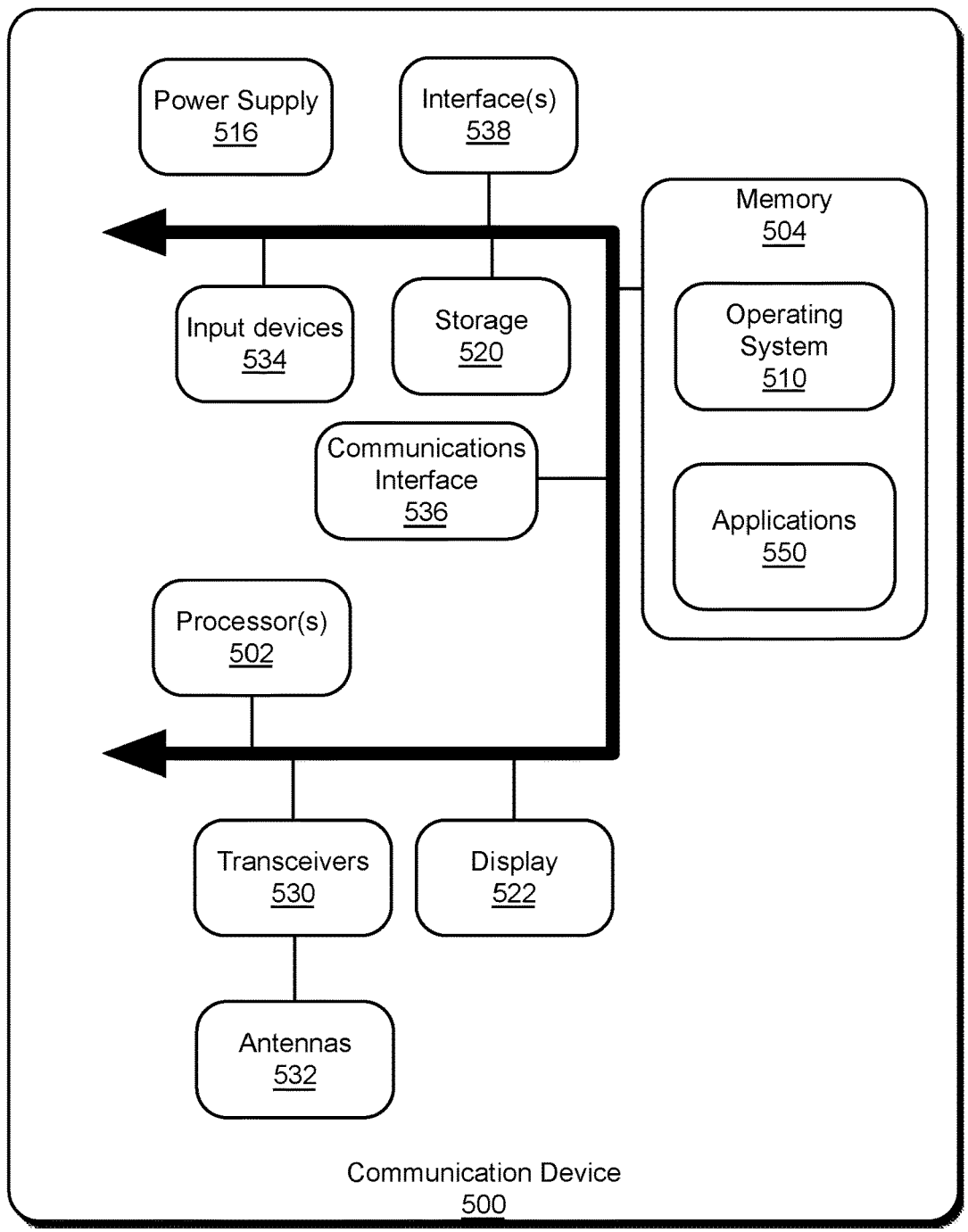
FIG. 5 illustrates an example operating environment and system for filtering out-of-band radio frequency emissions.

FIG. 5 illustrates an example communication device 500 for implementing the features and operations of the described technology. The communication device 500 may be a client device, such as a laptop, mobile device, desktop, tablet; a server/cloud device; an internet-of-things device; an electronic accessory; or another electronic device. The communication device 500 includes one or more processor(s) 502 and a memory 504. The memory 504 generally includes both volatile memory (e.g., RAM) and nonvolatile memory (e.g., flash memory). An operating system 510 resides in the memory 504 and is executed by the processor(s) 502.

In an example communication device 500, as shown in FIG. 5, one or more modules or segments, such as communication software 550, application modules, transmitter synchronizers, amplitude matchers, signal combiners, signal inverters, signal modulators, and other modules, are loaded into the operating system 510 on the memory 504 and/or storage 520 and executed by processor(s) 502. The storage 520 may store communication parameters, signal data, and other data and be local to the communication device 500 or may be remote and communicatively connected to the communication device 500.

The communication device 500 includes a power supply 516, which is powered by one or more batteries or other power sources and which provides power to other components of the communication device 500. The power supply 516 may also be connected to an external power source that overrides or recharges the built-in batteries or other power sources.

The communication device 500 may include one or more communication transceivers 530 which may be connected to one or more antenna(s) 532 to provide network connectivity (e.g., mobile phone network, Wi-Fi®, Bluetooth®) to one or more other servers and/or client devices (e.g., mobile devices, desktop computers, or laptop computers). The communication device 500 may further include a network adapter 536, which is a type of communication device. The communication device 500 may use the adapter and any other types of communication devices for establishing connections over a wide-area network (WAN) or local-area network (LAN). It should be appreciated that the network connections shown are exemplary and that other communication devices and means for establishing a communications link between the communication device 500 and other devices may be used.

The communication device 500 may include one or more input devices 534 such that a user may enter commands and information (e.g., a keyboard or mouse). These and other input devices may be coupled to the server by one or more interfaces 538, such as a serial port interface, parallel port, or universal serial bus (USB). The communication device 500 may further include a display 522, such as a touch screen display.

The communication device 500 may include a variety of tangible processor-readable storage media and intangible processor-readable communication signals. Tangible processor-readable storage can be embodied by any available media that can be accessed by the communication device 500 and includes both volatile and nonvolatile storage media, removable and non-removable storage media. Tangible processor-readable storage media excludes communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the communication device 500. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

While this specification contains many specific implementation details, these should not be construed as limitations on the scope of any inventions or of what may be claimed, but rather as descriptions of features specific to particular embodiments of a particular described technology. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

An example method of filtering out-of-band radio frequency emissions generated by wireless transmission of a first signal by a first transmitter from a wireless transmission of a second transmitter is provided. The method includes communicating the first signal from the first transmitter to the second transmitter via one or more wired connections, inverting an out-of-band portion of a modulated format of the first signal to generate an inverted out-of-band component signal, combining the inverted out-of-band component signal with a second signal of the second transmitter to create a filtering second signal, and wirelessly transmitting the filtering second signal from the second transmitter concurrently with wireless transmission of the first signal by the first transmitter, wherein the wireless transmission of the inverted out-of-band component signal in the filtering second signal by the second transmitter is synchronized with the wireless transmission of the first signal by the first transmitter.

Another example method of any preceding method is provided, wherein the communicating includes modulating the first signal at the first transmitter into the modulated format of the first signal and receiving the first signal at the second transmitter from the first transmitter in the modulated format.

Another example method of any preceding method is provided, wherein the communicating includes receiving the first signal at the second transmitter from the first transmitter as a sequence of symbols in an unmodulated format of the first signal and modulating the sequence of symbols at the second transmitter to the modulated format of the first signal, responsive to receiving the first signal.

Another example method of any preceding method further includes communicating a synchronization signal between the first transmitter and the second transmitter via the one or more wired connections, the synchronization signal indicating timing information to synchronize the wireless transmission of the inverted out-of-band component signal in the filtering second signal by the second transmitter with the wireless transmission of the first signal by the first transmitter.

Another example method of any preceding method is provided, wherein the out-of-band portion of the modulated format of the first signal includes energy outside a channel bandwidth of the second transmitter.

Another example method of any preceding method is provided, wherein the out-of-band portion of the modulated format of the first signal includes energy outside a channel bandwidth of the first transmitter.

Another example method of any preceding method further includes adjusting the amplitude of the inverted out-of-band component signal to highly correlate with the amplitude of the out-of-band radio frequency emissions received from the wireless transmission of the first signal by the first transmitter.

An example system for filtering out-of-band radio frequency emissions is provided, includes a first transmitter, a second transmitter, one or more wired connections configured to communicate a first signal from the first transmitter to the second transmitter, a signal inverter configured to invert an out-of-band portion of a modulated format of the first signal to generate an inverted out-of-band component signal, a signal combiner configured to combine the inverted out-of-band component signal with a second signal of the second transmitter to create a filtering second signal, and a transmitter synchronizer configured to wirelessly transmit the filtering second signal by the second transmitter concurrently with wireless transmission of the first signal by the first transmitter, the wireless transmission of the inverted out-of-band component signal in the filtering second signal by the second transmitter being synchronized with the wireless transmission of the first signal by the first transmitter.

Another example system of any preceding system is provided, wherein the first transmitter is configured to modulate the first signal into the modulated format of the first signal, and the second transmitter is configured to receive the first signal at the second transmitter from the first transmitter in the modulated format.

Another example system of any preceding system is provided, wherein the second transmitter is configured to receive the first signal from the first transmitter as a sequence of symbols in an unmodulated format of the first signal and to modulate the sequence of symbols to the modulated format of the first signal.

Another example system of any preceding system is provided, wherein the one or more wired connections are configured to communicate a synchronization signal between the first transmitter and the second transmitter, the synchronization signal indicating timing information to synchronize the wireless transmission of the inverted out-of-band component signal in the filtering second signal by the second transmitter with the wireless transmission of the first signal by the first transmitter.

Another example system of any preceding system is provided, wherein the out-of-band portion of the modulated format of the first signal includes energy outside a channel bandwidth of the second transmitter.

Another example system of any preceding system is provided, wherein the out-of-band portion of the modulated format of the first signal includes energy outside a channel bandwidth of the first transmitter.

Another example system of any preceding system further includes an amplitude matcher configured to adjust the amplitude of the inverted out-of-band component signal to highly correlate with the amplitude of the out-of-band radio frequency emissions received from the wireless transmission of the first signal by the first transmitter.

One or more tangible processor-readable storage media of a tangible article of manufacture encoding processor-executable instructions for executing on an electronic communication device provides a process of filtering out-of-band radio frequency emissions generated by wireless transmission of a first signal by a first transmitter from a wireless transmission of a second transmitter The process includes communicating the first signal from the first transmitter to the second transmitter via one or more wired connections, inverting an out-of-band portion of a modulated format of the first signal to generate an inverted out-of-band component signal, combining the inverted out-of-band component signal with a second signal of the second transmitter to create a filtering second signal, and wirelessly transmitting the filtering second signal from the second transmitter concurrently with wireless transmission of the first signal by the first transmitter, wherein the wireless transmission of the inverted out-of-band component signal in the filtering second signal by the second transmitter is synchronized with the wireless transmission of the first signal by the first transmitter.

One or more other example tangible processor-readable storage media of any preceding storage media are provided, wherein the communicating includes modulating the first signal at the first transmitter into the modulated format of the first signal and receiving the first signal at the second transmitter from the first transmitter in the modulated format.

One or more other example tangible processor-readable storage media of any preceding storage media are provided, wherein the communicating includes receiving the first signal at the second transmitter from the first transmitter as a sequence of symbols in an unmodulated format of the first signal and modulating the sequence of symbols at the second transmitter to the modulated format of the first signal, responsive to receiving the first signal.

One or more other example tangible processor-readable storage media of any preceding storage media, wherein the process further includes communicating a synchronization signal between the first transmitter and the second transmitter via the one or more wired connections, the synchronization signal indicating timing information to synchronize the wireless transmission of the inverted out-of-band component signal in the filtering second signal by the second transmitter with the wireless transmission of the first signal by the first transmitter.

One or more other example tangible processor-readable storage media of any preceding storage media are provided, wherein the out-of-band portion of the modulated format of the first signal includes energy outside a channel bandwidth of the second transmitter.

One or more other example tangible processor-readable storage media of any preceding storage media are provided, wherein the process further includes adjusting the amplitude of the inverted out-of-band component signal to highly correlate with the amplitude of the out-of-band radio frequency emissions received from the wireless transmission of the first signal by the first transmitter.

An example system for filtering out-of-band radio frequency emissions generated by wireless transmission of a first signal by a first transmitter from a wireless transmission of a second transmitter is provided. The system includes means for communicating the first signal from the first transmitter to the second transmitter via one or more wired connections, means for inverting an out-of-band portion of a modulated format of the first signal to generate an inverted out-of-band component signal, means for combining the inverted out-of-band component signal with a second signal of the second transmitter to create a filtering second signal, and means for wirelessly transmitting the filtering second signal from the second transmitter concurrently with wireless transmission of the first signal by the first transmitter, wherein the wireless transmission of the inverted out-of-band component signal in the filtering second signal by the second transmitter is synchronized with the wireless transmission of the first signal by the first transmitter.

Another example system of any preceding system is provided, wherein the means for communicating includes means for modulating the first signal at the first transmitter into the modulated format of the first signal and means for receiving the first signal at the second transmitter from the first transmitter in the modulated format.

Another example system of any preceding system is provided, wherein the means for communicating includes means for receiving the first signal at the second transmitter from the first transmitter as a sequence of symbols in an unmodulated format of the first signal and means for modulating the sequence of symbols at the second transmitter to the modulated format of the first signal, responsive to receiving the first signal.

Another example system of any preceding system further includes means for communicating a synchronization signal between the first transmitter and the second transmitter via the one or more wired connections, the synchronization signal indicating timing information to synchronize the wireless transmission of the inverted out-of-band component signal in the filtering second signal by the second transmitter with the wireless transmission of the first signal by the first transmitter.

Another example system of any preceding system is provided, wherein the out-of-band portion of the modulated format of the first signal includes energy outside a channel bandwidth of the second transmitter.

Another example system of any preceding system is provided, wherein the out-of-band portion of the modulated format of the first signal includes energy outside a channel bandwidth of the first transmitter.

Another example system of any preceding system further includes means for adjusting the amplitude of the inverted out-of-band component signal to highly correlate with the amplitude of the out-of-band radio frequency emissions received from the wireless transmission of the first signal by the first transmitter.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the described technology have been described. Nevertheless, it will be understood that various modifications can be made without departing from the spirit and scope of the recited claims.

What is claimed is:

1. A method of filtering out-of-band radio frequency emissions generated by wireless transmission of a first signal by a first transmitter from a wireless transmission of a second transmitter, the method comprising:
communicating the first signal from the first transmitter to the second transmitter via one or more wired connections;
inverting an out-of-band portion of a modulated format of the first signal to generate an inverted out-of-band component signal;
combining the inverted out-of-band component signal with a second signal of the second transmitter to create a filtering second signal; and
wirelessly transmitting the filtering second signal from the second transmitter concurrently with wireless transmission of the first signal by the first transmitter, wherein the wireless transmission of the inverted out-of-band component signal in the filtering second signal by the second transmitter is synchronized with the wireless transmission of the first signal by the first transmitter.

2. The method of claim 1, wherein the communicating comprises:
modulating the first signal at the first transmitter into the modulated format of the first signal; and
receiving the first signal at the second transmitter from the first transmitter in the modulated format.

3. The method of claim 1, wherein the communicating comprises:
receiving the first signal at the second transmitter from the first transmitter as a sequence of symbols in an unmodulated format of the first signal; and
modulating the sequence of symbols at the second transmitter to the modulated format of the first signal, responsive to receiving the first signal.

4. The method of claim 1, further comprising:
communicating a synchronization signal between the first transmitter and the second transmitter via the one or more wired connections, the synchronization signal indicating timing information to synchronize the wireless transmission of the inverted out-of-band component signal in the filtering second signal by the second transmitter with the wireless transmission of the first signal by the first transmitter.

5. The method of claim 1, wherein the out-of-band portion of the modulated format of the first signal includes energy outside a channel bandwidth of the second transmitter.

6. The method of claim 1, wherein the out-of-band portion of the modulated format of the first signal includes energy outside a channel bandwidth of the first transmitter.

7. The method of claim 1, further comprising:
adjusting the amplitude of the inverted out-of-band component signal to highly correlate with the amplitude of the out-of-band radio frequency emissions received from the wireless transmission of the first signal by the first transmitter.

8. A system for filtering out-of-band radio frequency emissions, the system comprising:
a first transmitter;
a second transmitter;
one or more wired connections configured to communicate a first signal from the first transmitter to the second transmitter;
a signal inverter configured to invert an out-of-band portion of a modulated format of the first signal to generate an inverted out-of-band component signal;
a signal combiner configured to combine the inverted out-of-band component signal with a second signal of the second transmitter to create a filtering second signal; and
a transmitter synchronizer configured to wirelessly transmit the filtering second signal by the second transmitter concurrently with wireless transmission of the first signal by the first transmitter, the wireless transmission of the inverted out-of-band component signal in the filtering second signal by the second transmitter being synchronized with the wireless transmission of the first signal by the first transmitter.

9. The system of claim 8, wherein the first transmitter is configured to modulate the first signal into the modulated format of the first signal, and the second transmitter is configured to receive the first signal at the second transmitter from the first transmitter in the modulated format.

10. The system of claim 8, wherein the second transmitter is configured to receive the first signal from the first transmitter as a sequence of symbols in an unmodulated format of the first signal and to modulate the sequence of symbols to the modulated format of the first signal.

11. The system of claim 8, wherein the one or more wired connections are configured to communicate a synchronization signal between the first transmitter and the second transmitter, the synchronization signal indicating timing information to synchronize the wireless transmission of the inverted out-of-band component signal in the filtering second signal by the second transmitter with the wireless transmission of the first signal by the first transmitter.

12. The system of claim 8, wherein the out-of-band portion of the modulated format of the first signal includes energy outside a channel bandwidth of the second transmitter.

13. The system of claim 8, wherein the out-of-band portion of the modulated format of the first signal includes energy outside a channel bandwidth of the first transmitter.

14. The system of claim 8, further comprising:
an amplitude matcher configured to adjust the amplitude of the inverted out-of-band component signal to highly correlate with the amplitude of the out-of-band radio frequency emissions received from the wireless transmission of the first signal by the first transmitter.

15. One or more tangible processor-readable storage media of a tangible article of manufacture encoding processor-executable instructions for executing on an electronic communication device a process of filtering out-of-band radio frequency emissions generated by wireless transmission of a first signal by a first transmitter from a wireless transmission of a second transmitter, the process comprising:
communicating the first signal from the first transmitter to the second transmitter via one or more wired connections;
inverting an out-of-band portion of a modulated format of the first signal to generate an inverted out-of-band component signal;
combining the inverted out-of-band component signal with a second signal of the second transmitter to create a filtering second signal; and wirelessly transmitting the filtering second signal from the second transmitter concurrently with wireless transmission of the first signal by the first transmitter, wherein the wireless transmission of the inverted out-of-band component signal in the filtering second signal by the second transmitter is synchronized with the wireless transmission of the first signal by the first transmitter.

16. The one or more tangible processor-readable storage media of claim 15, wherein the communicating comprises:
   modulating the first signal at the first transmitter into the modulated format of the first signal; and
   receiving the first signal at the second transmitter from the first transmitter in the modulated format.

17. The one or more tangible processor-readable storage media of claim 15, wherein the communicating comprises:
   receiving the first signal at the second transmitter from the first transmitter as a sequence of symbols in an unmodulated format of the first signal; and
   modulating the sequence of symbols at the second transmitter to the modulated format of the first signal, responsive to receiving the first signal.

18. The one or more tangible processor-readable storage media of claim 15, wherein the process further comprises:
   communicating a synchronization signal between the first transmitter and the second transmitter via the one or more wired connections, the synchronization signal indicating timing information to synchronize the wireless transmission of the inverted out-of-band component signal in the filtering second signal by the second transmitter with the wireless transmission of the first signal by the first transmitter.

19. The one or more tangible processor-readable storage media of claim 15, wherein the out-of-band portion of the modulated format of the first signal includes energy outside a channel bandwidth of the second transmitter.

20. The one or more tangible processor-readable storage media of claim 15, wherein the process further comprises:
   adjusting the amplitude of the inverted out-of-band component signal to highly correlate with the amplitude of the out-of-band radio frequency emissions received from the wireless transmission of the first signal by the first transmitter.

\* \* \* \* \*